United States Patent
Shaaban et al.

(10) Patent No.: US 12,322,302 B2
(45) Date of Patent: Jun. 3, 2025

(54) SYSTEM AND METHOD FOR EVALUATING AND OPTIMIZING STUDY SESSIONS

(71) Applicant: Fulcrum Global Technologies Inc., Chicago, IL (US)

(72) Inventors: Ahmed Farouk Shaaban, South Barrington, IL (US); Venkat Thandra, South Barrington, IL (US)

( * ) Notice: Subject to any disclaimer, the term of this patent is extended or adjusted under 35 U.S.C. 154(b) by 899 days.

(21) Appl. No.: 16/983,197

(22) Filed: Aug. 3, 2020

(65) Prior Publication Data
US 2021/0043100 A1    Feb. 11, 2021

Related U.S. Application Data

(60) Provisional application No. 62/885,246, filed on Aug. 10, 2019, provisional application No. 62/887,181, filed on Aug. 15, 2019.

(51) Int. Cl.
*G09B 7/04*    (2006.01)
*G09B 5/12*    (2006.01)

(52) U.S. Cl.
CPC .............. *G09B 7/04* (2013.01); *G09B 5/12* (2013.01)

(58) Field of Classification Search
CPC ... G09B 7/00; G09B 7/04; G09B 5/00; G09B 5/12; G09B 9/00
See application file for complete search history.

(56) References Cited

U.S. PATENT DOCUMENTS

| | | | |
|---|---|---|---|
| 11,676,506 B1* | 6/2023 | Moreno | G09B 7/02 434/236 |
| 2003/0129574 A1* | 7/2003 | Ferriol | G09B 5/00 434/323 |
| 2005/0078868 A1* | 4/2005 | Chen | G06F 16/739 345/428 |
| 2007/0202481 A1* | 8/2007 | Smith Lewis | G09B 19/06 434/323 |
| 2008/0254426 A1* | 10/2008 | Cohen | G09B 5/00 434/308 |
| 2010/0028846 A1* | 2/2010 | Cohen | G09B 5/065 434/323 |
| 2011/0125519 A1* | 5/2011 | Dhoble | G16H 80/00 705/2 |
| 2013/0260351 A1* | 10/2013 | Pasqualis | G09B 5/00 434/322 |
| 2013/0316324 A1* | 11/2013 | Hoffmann | G09B 7/00 434/362 |

(Continued)

*Primary Examiner* — Timothy A Musselman
(74) *Attorney, Agent, or Firm* — Global IP Counsellors, LLP

(57) ABSTRACT

Systems and methods for optimizing study sessions are disclosed herein. In an embodiment, a system for optimizing study sessions includes a graphical user interface (GUI), a timing device, a processor and a memory. The GUI accepts input from a user regarding a first study session. The timing device elapses for a first amount of time during the first study session. The processor and the memory are configured to: record the first amount of time elapsed by the timing device during the first study session; calculate at least one value regarding an effectiveness of the first study session; using the at least one value, calculate a second amount of time to be optimal for a second study session; and cause the graphical user interface to propose the second amount of time when the user begins the second study session.

18 Claims, 12 Drawing Sheets

(56) References Cited

U.S. PATENT DOCUMENTS

| | | | | |
|---|---|---|---|---|
| 2014/0030691 A1* | 1/2014 | Liu | ............................ | G09B 5/06 |
| | | | | 434/365 |
| 2014/0148930 A1* | 5/2014 | Goodwin | .................. | G09B 5/00 |
| | | | | 700/92 |
| 2014/0193791 A1* | 7/2014 | Mcbride | ................... | G09B 7/02 |
| | | | | 434/350 |
| 2016/0217481 A1* | 7/2016 | Pastore | ............... | G06Q 30/0203 |
| 2018/0226150 A1* | 8/2018 | Hayter | .................. | A61B 5/0031 |
| 2019/0139429 A1* | 5/2019 | Rattigan | .............. | G06F 16/9535 |
| 2021/0082302 A1* | 3/2021 | Jeong | ........................ | G09B 7/08 |
| 2021/0343176 A1* | 11/2021 | Harlow | ................... | G06F 17/18 |

\* cited by examiner

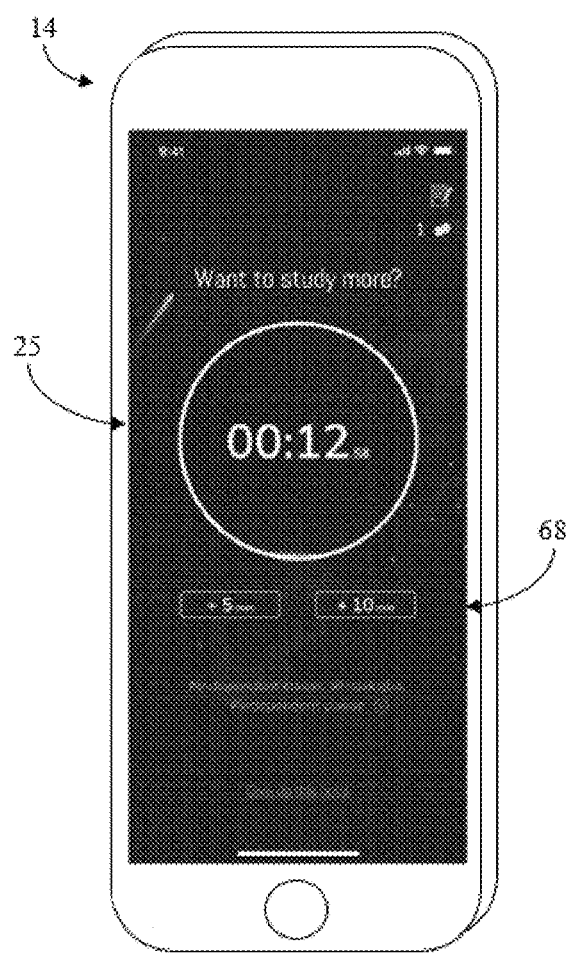
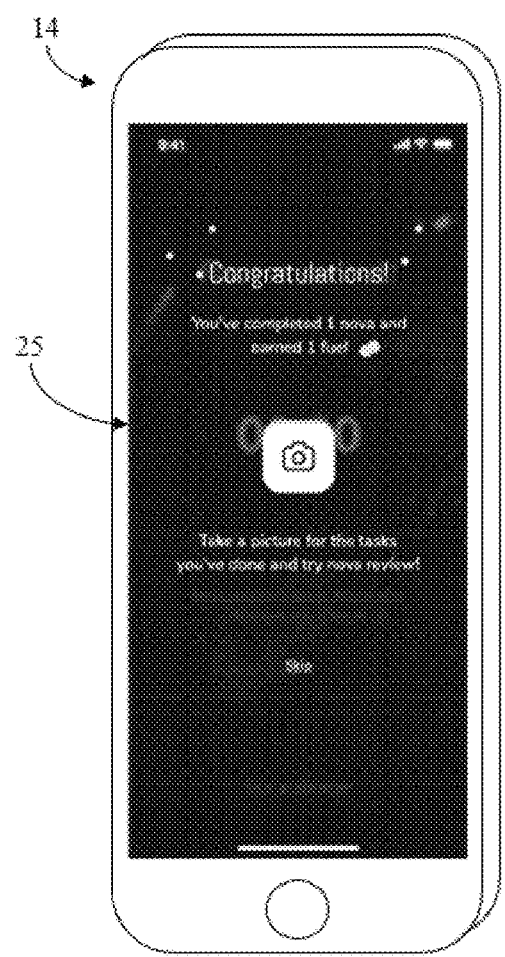
FIG. 9  FIG. 10

SYSTEM AND METHOD FOR EVALUATING AND OPTIMIZING STUDY SESSIONS

PRIORITY

This patent application claims priority to U.S. Provisional Patent Application No. 62/885,246, filed Aug. 10, 2019, entitled "Personalized Study Application," and to U.S. Provisional Patent Application No. 62/887,181, filed Aug. 15, 2019, entitled "Study Timer with Improved Personalization," the entirety of each of which is incorporated herein by reference and relied upon.

BACKGROUND

Technical Field

This disclosure generally relates to a system and method for evaluating and optimizing study sessions. More specifically, the present disclosure relates to a system and method for optimizing the time spent studying particular areas of interest and enabling automatic generation of corresponding study questions.

Background Information

Various tools for assisting students in their studies are available. These include various types of software-based or computer-implemented timers that can incorporate spaced repetition of targeted concepts. While such tools can be effective for some, they are not necessarily effective in the face of modern distractions such as smart phones and the like.

SUMMARY

It has been discovered that tools for optimizing study sessions are desired. A first aspect of the present disclosure is to provide a system for optimizing one or more study session for a user. The system comprises a graphical user interface, a timing device, a processor, and a memory. The graphical user interface is configured to accept input from the user regarding a first study session. The timing device is configured to elapse for a first amount of time during the first study session. The processor is configured to execute instructions stored on the memory to: (i) record the first amount of time elapsed by the timing device during the first study session; (ii) calculate at least one value regarding an effectiveness of the first study session; (iii) using the at least one value and the recorded first amount of time, calculate a second amount of time to be optimal for a second study session; and (iv) cause the graphical user interface to propose the second amount of time when the user begins the second study session.

In accordance with a second aspect of the present disclosure, which can be combined with the first aspect, the graphical user interface is located on a user terminal and associated with a study application, and the effectiveness of the first study session is based on a determination of an amount of time that the user accessed one or more alternative application during elapse of the first amount of time.

In accordance with a third aspect of the present disclosure, which can be combined with any one or more of the previous aspects, the graphical user interface is located on a user terminal and associated with a study application, and the effectiveness of the first study session is based on a determination of a number of times that the user accessed one or more alternative application during elapse of the first amount of time.

In accordance with a fourth aspect of the present disclosure, which can be combined with any one or more of the previous aspects, the system includes a user terminal, wherein the user terminal includes at least one of the graphical user interface, the timing device, the processor, and the memory.

In accordance with a fifth aspect of the present disclosure, which can be combined with any one or more of the previous aspects, the processor is further configured to determine an optimal day and time for the user to perform the second study session.

In accordance with a sixth aspect of the present disclosure, which can be combined with any one or more of the previous aspects, the processor is configured to update a digital calendar for the user by scheduling the second study session at the optimal day and time within the digital calendar.

In accordance with a seventh aspect of the present disclosure, which can be combined with any one or more of the previous aspects, the system includes an image recording device, and wherein the processor is further configured to create a summary of the first study session using at least one image taken with the image recording device.

In accordance with an eighth aspect of the present disclosure, which can be combined with any one or more of the previous aspects, the system includes an image recording device, and the processor is further configured to create at least one question regarding material studied during the first study session using at least one image taken with the image recording device.

In accordance with a ninth aspect of the present disclosure, which can be combined with any one or more of the previous aspects, the processor is configured to calculate the at least one value regarding the effectiveness of the first study session based on at least one user answer to the at least one question.

In accordance with a tenth aspect of the present disclosure, which can be combined with any one or more of the previous aspects, a method for optimizing one or more study session for a user includes recording a first amount of time elapsed during a first study session performed by the user, calculating at least one value regarding an effectiveness of the first study session, calculating a second amount of time to be optimal for a second study session using the at least one value and the recorded first amount of time, and causing the second amount of time to be proposed to the user when the user begins the second study session.

In accordance with an eleventh aspect of the present disclosure, which can be combined with any one or more of the previous aspects, the method includes displaying a display screen for a study application on a user terminal controlled by the user during the first study session, and calculating the at least one value regarding the effectiveness of the first study session includes determining an amount of time that the user accessed one or more alternative application on the user terminal during the first study session.

In accordance with a twelfth aspect of the present disclosure, which can be combined with any one or more of the previous aspects, the method includes displaying a display screen for a study application on a user terminal controlled by the user during the first study session, and calculating the at least one value regarding the effectiveness of the first study session includes determining a number of times that the user accessed one or more alternative application on the user terminal during the first study session.

In accordance with a thirteenth aspect of the present disclosure, which can be combined with any one or more of the previous aspects, the method includes determining an optimal day and time for the user to perform the second study session.

In accordance with a fourteenth aspect of the present disclosure, which can be combined with any one or more of the previous aspects, the method includes updating a digital calendar for the user by automatically scheduling the second study session at the optimal day and time within the digital calendar.

In accordance with a fifteenth aspect of the present disclosure, which can be combined with any one or more of the previous aspects, the method includes generating at least one question regarding the first study session based on an image of material studied during the first study session.

In accordance with a sixteenth aspect of the present disclosure, which can be combined with any one or more of the previous aspects, the method includes calculating the at least one value regarding the effectiveness of the first study session includes calculating the at least one value using a metric based on at least one user answer to the at least one question.

In accordance with a seventeenth aspect of the present disclosure, which can be combined with any one or more of the previous aspects, a method for optimizing one or more study session for a user includes recording a first amount of time elapsed during a first study session performed by the user, receiving at least one image of material studied by the user during the first study session, generating at least one question regarding the first study session based on the at least one image, calculating at least one value regarding an effectiveness of the first study session based on at least one user answer to the at least one question, and calculating a second amount of time to be optimal for a second study session using the at least one value and the recorded first amount of time.

In accordance with an eighteenth aspect of the present disclosure, which can be combined with any one or more of the previous aspects, the method includes extracting text from the at least one image, and using the extracted text when generating the at least one question.

In accordance with a nineteenth aspect of the present disclosure, which can be combined with any one or more of the previous aspects, the method includes determining at least one numerical value for at least one word or sentence in the extracted text, and using the at least one numerical value when calculating the at least one value regarding the effectiveness of the first study session.

In accordance with a twentieth aspect of the present disclosure, which can be combined with any one or more of the previous aspects, the method includes generating a plurality of questions of varying difficulties based on the at least one image, and calculating the at least one value includes scoring the varying difficulties and using the scores during calculation of the at least one value.

BRIEF DESCRIPTION OF THE DRAWINGS

Referring now to the attached drawings which form a part of this original disclosure:

FIGS. 5 to 20 illustrate example embodiments of a graphical user interface during the methods of FIGS. 3 and 4.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
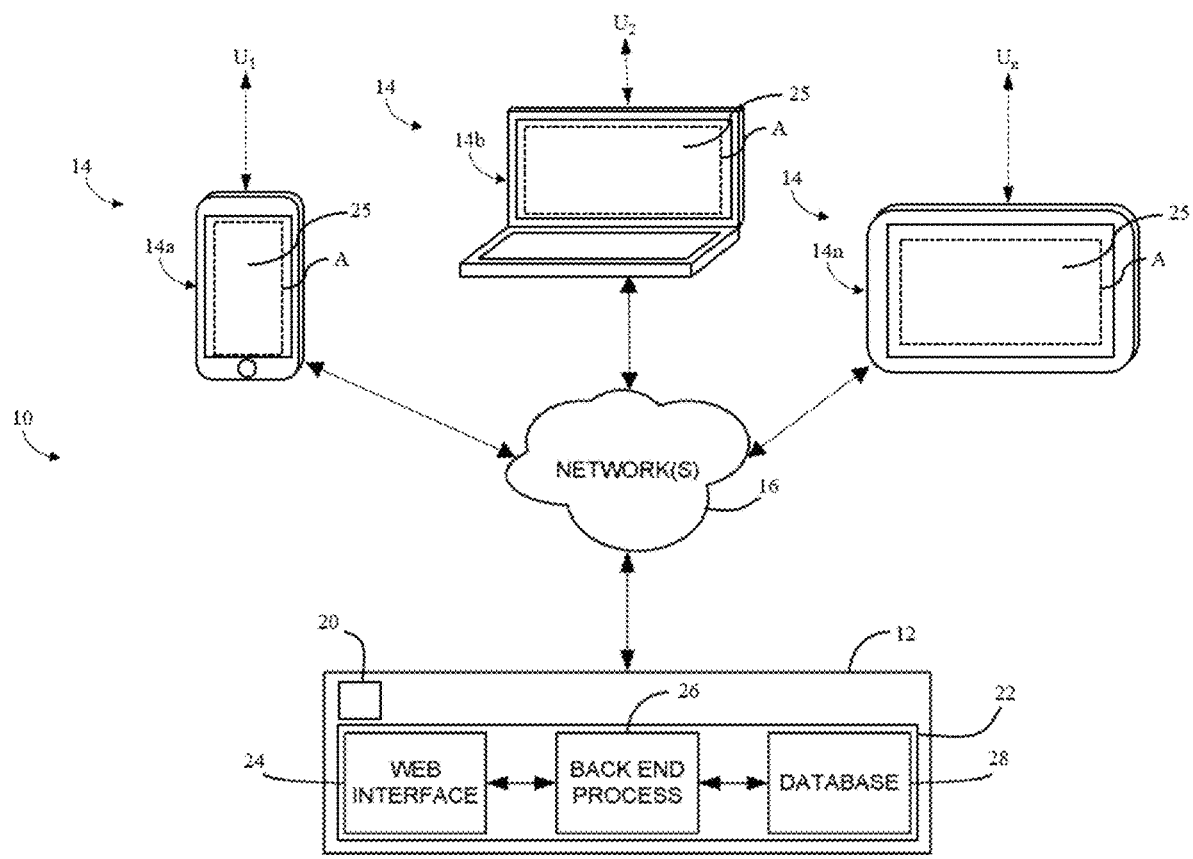
FIG. 1 illustrates an example embodiment of a system for optimizing study sessions in accordance with the present disclosure.

FIG. 1 illustrates an example embodiment of a system 10 for optimizing one or more study session $S_1, S_2 \ldots S_n$. In the illustrated embodiment, the system 10 includes a central server 12 and a plurality of user terminals 14 operated by a plurality of users $U_1, U_2 \ldots U_n$. In use, the central server 12 can wirelessly communicate with each of the user terminals 14 via a network 16 to optimize one or more study session $S_1, S_2 \ldots S_n$ for one or more of the users $U_1, U_2 \ldots U_n$. In an embodiment, the system 10 functions as a tool to assist one or more of the plurality of users $U_1, U_2 \ldots U_n$ in improving their study habits and the efficiency of their study time through the provision of personalized timers. The system 10 can also function as a tool to enhance the effectiveness of group study sessions involving a plurality of users $U_1, U_2 \ldots U_n$, for example, with study material effective for one or more user $U_1, U_2 \ldots U_n$ being used to optimize one or more study session $S_1, S_2 \ldots S_n$ for another user $U_1, U_2 \ldots U_n$.

Each of the plurality of user terminals 14 can be, for example, a cellular phone, a tablet, a personal computer, or another electronic device. Here, the plurality of user terminals 14 includes a first user terminal 14a, a second user terminal 14b, and an nth user terminal 14n. Each user terminal 14 can be controlled by a distinct user $U_1, U_2 \ldots U_n$ (e.g., a first user $U_1$ controls the first user terminal 14a, a second user $U_2$ controls the second user terminal 14b, and an nth user $U_n$ controls the nth user terminal 14n). The user $U_1, U_2 \ldots U_n$ of each user terminal 14 can be, for example, an individual person seeking to improve study habits and/or the effectiveness of time spent studying. As used herein, each of the users $U_1, U_2 \ldots U_n$ can also be referred to generally as a user U.

The user terminals 14 can communicate with the central server 12 via various communication protocols, for example, via an Internet Protocol Suite or TCP/IP supporting HTTP. The network 16 can comprise a public network (e.g., the Internet, World Wide Web, etc.), a private network (e.g., local area network (LAN), etc.), and/or combinations thereof (e.g., a virtual private network, LAN connected to the Internet, etc.). The network 16 can include a wired network, a wireless network, and/or a combination of the two.

The central server 12 can comprise one or more server computers, database servers and/or other types of computing devices, particularly in connection with, for example, the implementation of websites and/or enterprise software. The central server 12 can further comprise a central processor 20 and a central memory 22. The central processor 20 is configured to execute instructions programmed into and/or stored by the central memory 22. As described in more detail below, many of the steps of the methods described herein can be stored as instructions in the central memory 22 and executed by the central processor 20.

In the illustrated embodiment, the central memory 22 can include a web interface 24, a database 26, and back end processing instructions 28. Here, the web interface 24, the database 26, and the back end processing instructions 28 can be controlled or accessed by the central processor 20 implementing appropriate software programs by executing the back end processing instructions 28 or other instructions programmed into and/or stored by the central memory 22. For example, in an embodiment, the web interface 24 and the back end processing instructions 28 can be implemented using the Django web framework, and the database 26 can be implemented using the PostgreSQL relational database management system (RDBMS). The web interface 24 operates to provide a graphical user interface 25 (GUI 25) that can be displayed on a user terminal 14 for a user U and/or used to prompt a user U for inputs concerning operation of timers and feedback concerning the effectiveness of one or more study session $S_1, S_2 \ldots S_n$.

In an embodiment, each user terminal 14 can include an application A comprising software downloaded to and executed by the user terminal 14 to provide the GUI 25 and to manage communications with the central server 12. The application A can be downloaded to the user terminal 14 from the central server 12 or from some other source such as an application distribution platform.

In addition to user credentials and similar data necessary to implement a web-based service, the database 26 can store all data relevant to each user U's study session $S_1, S_2 \ldots S_n$ such as any subject-matter tags (concepts) associated with the sessions, time lengths, and/or contextual data (e.g., the calendar day, day of the week, and/or time of day a study session S is operated and success metrics for a study session S). Additionally, in accordance with an incentivization system described herein, the database 26 can also store data concerning each user U's level of achievement within the incentivization system. Alternatively or additionally, the above data specific to a user U can be locally stored by that user U's user terminal 14. The database 26 can further store study session information regarding a group of users $U_1$, $U_2 \ldots U_n$ which can then be accessed by a teacher or tutor and/or used by the system 10 to enhance future group study sessions and/or improve an individual study session S for an individual user U.

The back end processing instructions 28 can be operatively coupled to both the web interface 24 and the database 26, and can be programmed into and/or stored by the central memory 22 and implemented by the central processor 20. In an embodiment, the back end processing instructions 28 can be executed by the central processor 20 to direct operations of the central server 12 as described below in further detail. For example, the central processor 20, executing the back end processing instructions 28, can manage the receipt, storage, maintenance, etc. of relevant data (e.g., received from one or more user U via a terminal 14) concerning the user U's study session $S_1, S_2 \ldots S_n$. Additionally, in an embodiment, the back end processing instructions 28 can implement the incentivization system as described in further detail below.

Figure 2:
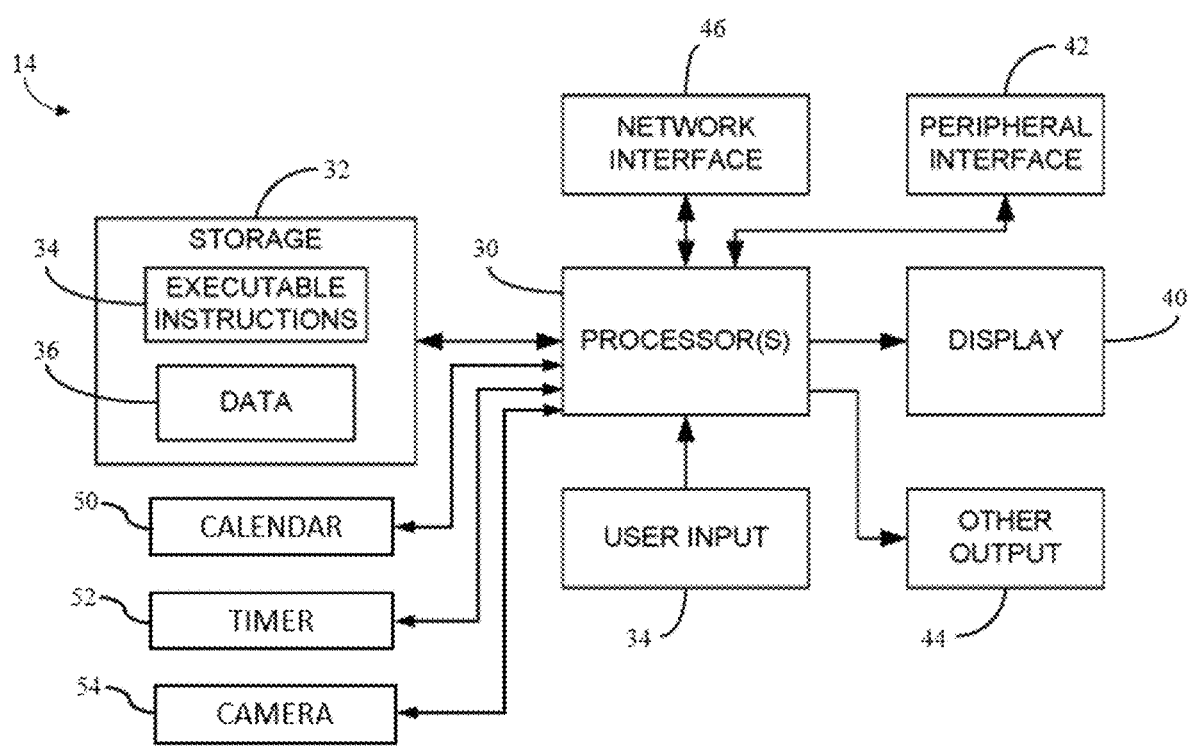
FIG. 2 is a representative diagram of an example embodiment of a user terminal which can be used in the system of FIG. 1.

FIG. 2 illustrates a representative diagram of an example embodiment of a user terminal 14. As illustrated, a user terminal 14 can include a terminal processor 30 and a terminal memory 32. The terminal processor 30 is configured to execute instructions programmed into and/or stored by the terminal memory 32. The instructions can be received from and/or periodically updated by the central server 12 in accordance with the methods discussed below. As described in more detail below, many of the steps of the methods described herein can be stored as instructions in the terminal memory 32 and executed by the terminal processor 30.

In an embodiment, the terminal processor 30 can comprise one or more of a microprocessor, a microcontroller, a digital signal processor, a co-processor or the like or combinations thereof capable of executing stored user instructions 34 and operating upon stored user data 36, wherein the user instructions 34 and/or stored user data 36 are stored by the terminal memory 32. Likewise, the terminal memory 32 can comprise one or more devices such as volatile or nonvolatile memory, for example, random access memory (RAM) or read only memory (ROM). Further still, the terminal memory 32 can be embodied in a variety of forms, such as a hard drive, optical disc drive, floppy disc drive, etc. In an embodiment, many of the processing techniques described herein are implemented as a combination of executable instructions 34 and data 36 within the terminal memory 32.

As illustrated, each of the plurality of user terminals 14 includes one or more user input device 38, a display 40, a peripheral interface 42, one or more other output device 44, and a network interface 46 in communication with the terminal processor 30. The user input device 38 can include any mechanism for providing a user input to the terminal processor 30, for example, a keyboard, a mouse, a touch screen, a microphone and/or suitable voice recognition application, or another input mechanism. The display 40 can include any conventional display mechanism such as a cathode ray tube (CRT), a flat panel display, a touch screen, or another display mechanism. Thus, as can be understood, the user input device 38 and/or the display 40 and/or any other suitable element can be considered a GUI 25. The peripheral interface 42 can include the hardware, firmware, and/or other software necessary for communication with various peripheral devices, such as media drives (e.g., magnetic disk or optical disk drives), other processing devices, or any other input source used as described herein. Likewise, the other output device 44 can optionally include similar media drive mechanisms, other processing devices or other output destinations capable of providing information to a user U of the user terminal 14, such as speakers, LEDs, tactile outputs, etc. The network interface 46 can comprise hardware, firmware and/or software that allows the terminal processor 30 to communicate with other devices via wired or wireless networks 16, whether local or wide area, private or public. For example, such networks 16 can include the World Wide Web or Internet, or private enterprise networks, or the like.

In various embodiments discussed herein, the user terminal 14 can include one or more of a digital calendar 50, a timing device 52, and an image recording device 54. In an embodiment, the digital calendar 50, the timing device 52, and/or the image recording device 54 can be integrally included with the user terminal 14. Alternatively, the user terminal 14 can be placed in wireless communication with the digital calendar 50, the timing device 52, and/or the image recording device 54 so as to enable operation as described herein.

The digital calendar 50 can be, for example, a calendar application which is downloaded to the user terminal 14 and/or stores the user U's past and/or future commitments.

In an embodiment, the digital calendar 50 can be associated with the user U's email, enabling the user U to schedule appointments based on third party email requests. In this way, the system 10 can access the digital calendar 50 to schedule one or more study session $S_1, S_2 \ldots S_n$ at an optimal day and/or time for the user while also fitting in with the user U's other scheduling conflicts. The digital calendar 50 can be stored on the terminal memory 32, or can be stored on an alternative memory device and accessed by the user terminal 14 via wireless communication over the network 16.

The timing device 52 can be, for example, an application which includes a timer that can be set to elapse for a variable amount of time. As used herein, the timing device 52 is capable of being started at the beginning of a study session S, elapsing during the study session S, stopped at the end of a study session S after elapse of a predetermined amount of time, and/or stopped or extended during the middle of a study session S. The timing device 52 can be stored on the terminal memory 32, or can be stored on an alternative memory device and accessed by the user terminal 14 via wireless communication over the network 16.

The image recording device 54 can be, for example, a device located on or in communication with the user terminal 14 that is configured to record one or more images and/or video. The image recording device 54 can further be configured to convert the recorded images and/or video into digital files which can thereafter be processed in accordance with the methods discussed herein. In an embodiment, the image recording device 54 includes a camera that is integral to the user terminal 14 and configured to take photographs of a textbook or other study material studied by a user U during a study session S. In another embodiment, the image recording device 54 includes an application which enables the creation of new images from the display of the GUI 25. The images displayed on the GUI 25 can include, for example, study material studied by a user U during a study session S using the GUI 25.

While the user terminal 14 has been described as one form for implementing the techniques described herein, those of ordinary skill in the art will appreciate from this disclosure that other functionally equivalent techniques can be employed. For example, some or all of the functionality implemented via executable instructions can also be implemented using firmware and/or hardware devices such as application specific integrated circuits (ASICs), programmable logic arrays, state machines, etc. Further, other implementations of the user terminal 14 can include a greater or lesser number of components than those illustrated. Further still, although a single user terminal 14 is illustrated in FIG. 2, it should be understood from this disclosure that a combination of such devices can be configured to operate in conjunction (for example, using known networking techniques) to implement the methods described herein.

Figure 3:
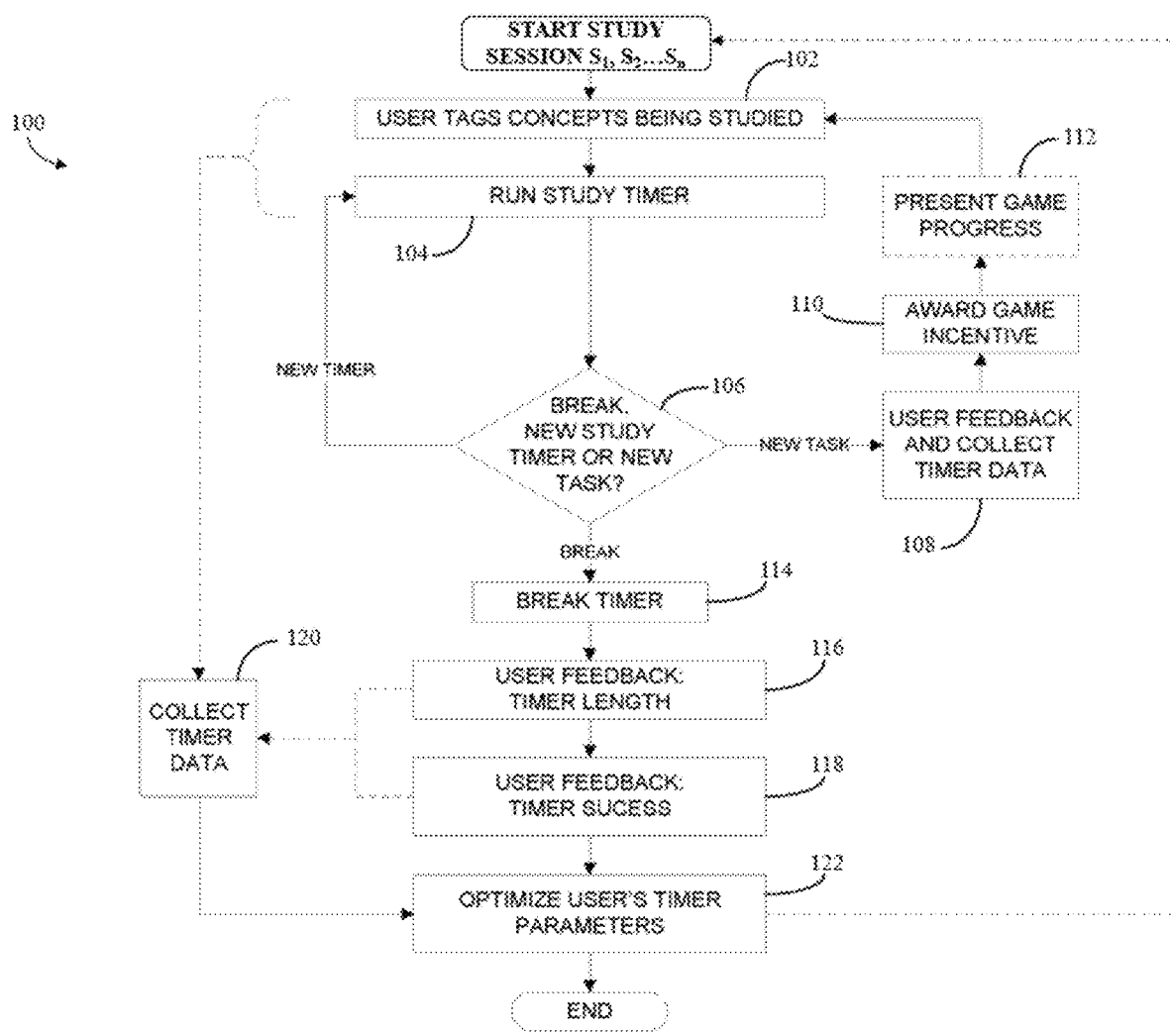
FIG. 3 illustrates an example embodiment of a method for optimizing study sessions using the system of FIG. 1.

FIG. 3 illustrates an example embodiment of a method 100 for optimizing one or more study sessions $S_1, S_2 \ldots S_n$. As used herein, each of the study sessions $S_1, S_2 \ldots S_n$ can also be referred to generally as a study session S. Some or all of the steps of method 100 can be stored as instructions on the central memory 22 and/or terminal memory 32 and can be executed by the central processor 20 and/or terminal processor 30 in accordance with the respective instructions stored on the central memory 22 and/or terminal memory 32. It should be understood that some of the steps described herein can be reordered or omitted without departing from the spirit or scope of method 100.

Though not illustrated in FIG. 3, the processing shown therein assumes that a user U has already created an account, logged into the system 10, and requested to start a first study session $S_1$ for use in conjunction with a particular task. As used herein, a task can be a period of time associated with particular subject matter being studied. It should be understood from this disclosure that the "first study session $S_1$" is described as being "first" herein for simplicity, and that the user U may have completed one or more other study sessions S using the system 10 as discussed herein prior to the first study session $S_1$ as described with respect to the method discussed below. Thus, the "first study session $S_1$" can already be an optimized study session as determined by the system 10 in accordance with the methods discussed herein.

At step 102, the user is asked to establish one or more tag 60 for the first study session $S_1$. As used herein, "tags" are brief descriptions of the particular subject matter being studied to be associated with a requested study time. For example, a student generally studying macroeconomics can tag a given study session S with the tags "cost-benefit analysis," "inflation," etc. As described below, these tags 60 can be used to optimize study parameters for that particular subject matter. In an embodiment, past tags 60 provided by the user U for previous study sessions S can be provided to the user U as potential suggestions for tagging the current study session S (here, first study session $S_1$). Alternatively, a pre-populated list of tags 60 associated with certain broad topics can be provided for this purpose (e.g., for a subject like "introductory calculus," a standardized set of tags 60 related to calculus terms could be employed). Additionally, prior to beginning the first study session $S_1$, the GUI 25 can inform the user U of a proposed time length, for example, based on the weighted average of the lengths of past study sessions S completed by the user U which used one or more of the same tags 60. When no previous study sessions S related to the tagged subject matter are available, the system 10 can propose a default value (e.g., 25 minutes). Regardless, when proposing the suggested time length, the user U is also provided the opportunity to increase or decrease the time length as desired.

In an embodiment, the first study session $S_1$ can be preset by a teacher or tutor. The first study session $S_1$ can be preset, for example, for a plurality of students taking the same class or studying the same subject. Here, the teacher or tutor can further create questions related to the subject being study which can be presented to each student at the end of the first study session $S_1$ to determine the effectiveness of the first study session $S_1$ with respect to that student. In an embodiment, the teacher or tutor can also set the length of the first study session $S_1$, which can optionally be adjusted by the user U if allowed by the teacher or tutor. The teacher or tutor can further assign one or more tags 60 to the first study session $S_1$.

Once the first study session $S_1$ has been tagged and the length of the time established, method 100 continues to step 104 where the timing device 52 begins to run. During elapse of the timing device 52, the GUI 25 presented to the user U can illustrate the passage of time. Additionally, the GUI 25 can provide the user U with the opportunity to revise/add to the one or more tags 60 applied to the first study session $S_1$ as the user U progresses through the material being studied. Further, as the timing device 52 approaches the end of the designated period for the first study session $S_1$, the GUI 25 can permit the user U to select options for adding time to the first study session $S_1$. As illustrated by the dotted lines next to steps 102 and 104, any information provided by the user U during the setup and/or elapse of the timing device 52 is captured and associated with the first study session $S_1$ as shown at step 120. For example, a study session S started at a given time can be timestamped accordingly and have associated therewith the tags 60 provided by the user U and the completed duration of the study session, inclusive of any extensions of time requested by the user U.

Figure 8:
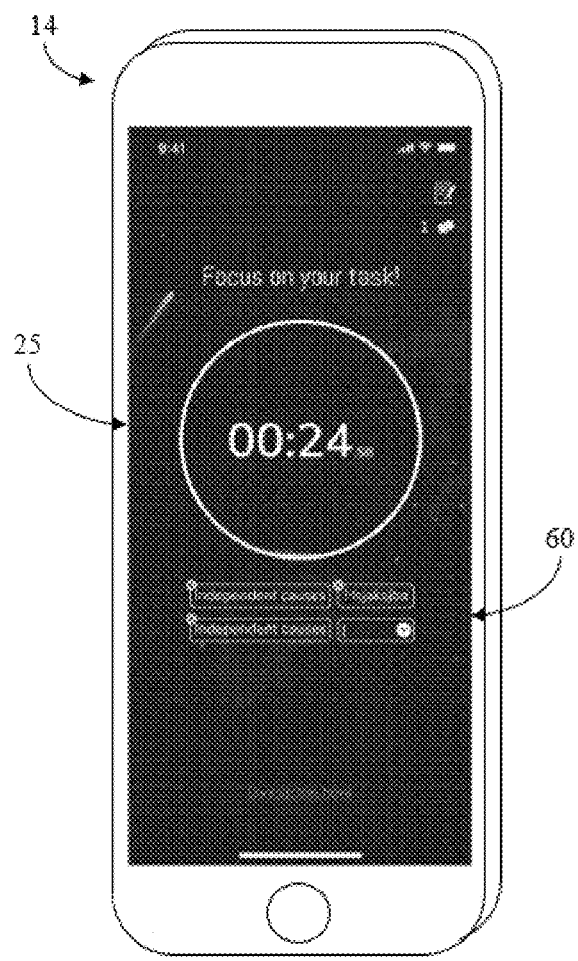
Figure 11:
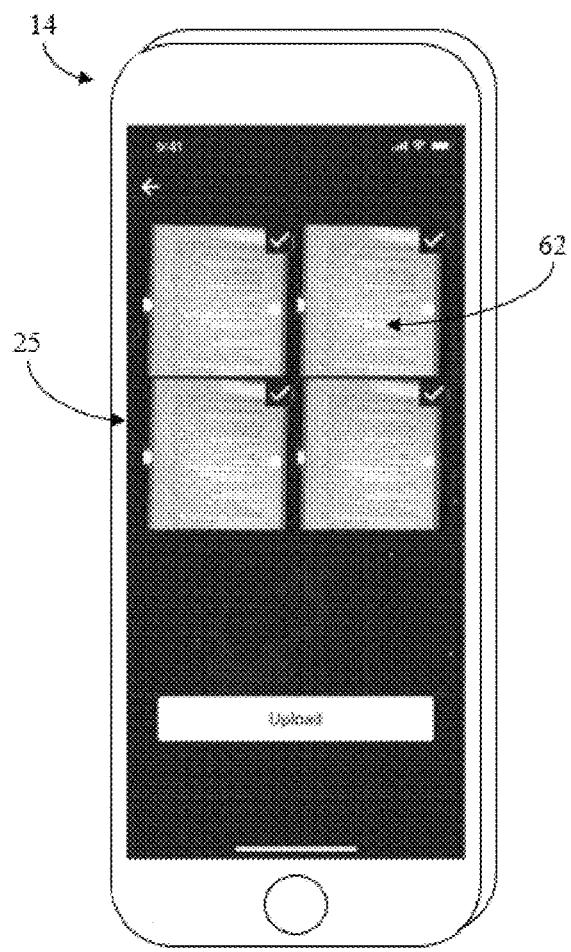

In an embodiment, the GUI 25 can display a study screen associated with elapse of the timing device 52 (e.g., as seen in FIG. 8), and the system 10 can track whether the user U became distracted during elapse of the timing device 52 by determining whether the user U, via the user terminal 14, navigated away from or otherwise took focus off of the GUI 25 provided for the study screen. For example, the system 10 can determine if the user U has closed the study screen and/or switched focus to another program or application on the user terminal 14. If so, the GUI 25 can cause a message to be displayed (and/or otherwise notify the user U that the change in focus has been detected via auditory and/or haptic feedback), thereby encouraging the user U to focus once again on the first study session $S_1$. If focus on something other than the first study session $S_1$ persists for longer than a predetermined threshold, the GUI 25 can inform the user U that continued lack of focus on the first study session $S_1$ will result in the timing device 52 being stopped and the first study session $S_1$ being treated as a failed session. On the other hand, a switch in focus back to the study screen can permit the first study session $S_1$ to continue. In this manner, the system 10 can assist the user U in avoiding distractions that might otherwise interrupt a study session S. The system 10 can also record the total length of time that the user U navigated away from the study screen during the first study session $S_1$ and/or the number of times that the user U navigated away from the study screen during the first study session $S_1$. The user U can further be required to provide auditory and/or haptic feedback to the user terminal 14 to confirm that he or she has returned to studying after being distracted.

In an embodiment, the image recording device 54 can be used to monitor the user U during the first study session $S_1$. Here, the system 10 can track whether the user U becomes distracted during elapse of the timing device 52 by determining whether the user U remains focused on the user terminal 14 and/or a textbook during this time. For example, if study materials are displayed on the GUI 25, then the system 10 can use the image recording device 54 to determine when the user U closes his or her eyes or otherwise focusses on something other than the GUI 25. Alternatively, if the study materials are in a textbook, the image recording device 54 can be set to focus on the user U while reading the textbook, wherein the system 10 then uses the image recording device 54 to determine when the user U closes his or her eyes or otherwise focusses on something other than the textbook. If such a detection is made, then the GUI 25 can cause a message to be displayed (and/or otherwise notify the user U that the change in focus has been detected via auditory and/or haptic feedback), thereby encouraging the user U to focus once again on the study materials. The user U can further be required to provide auditory and/or haptic feedback to the user terminal 14 to confirm that he or she has returned to studying after being distracted.

In an embodiment, at the beginning of the first study session $S_1$ the image recording device 54 can record an image and/or video of the user U in a studying position. The system 10 can then use that image and/or video as a baseline for determining when the user U becomes distracted. Thereafter, while the image recording device 54 records the user U during the first study session $S_1$, the system 10 can determine that the user U has become distracted if a new image and/or video deviates from the baseline image and/or video. For example, the deviation can be determined, for example, based on a change in pixels within the new image and/or video (e.g., a change in color/intensity of certain pixels).

When the timing device 52 indicates that the first study session $S_1$ has expired, method 100 can continue to step 106 where the user U is presented with several choices. First, if the user U wishes to continue with the current task, the GUI 25 enables the user U to initiate a new time period for the first study session $S_1$ and restart the timing device 52, thereby returning to step 104. Alternatively, the user U can opt to pursue a new task (i.e., study different subject matter), in which case processing continues to step 108, where the GUI 25 asks the user U to provide feedback on the first study session $S_1$, and the system 10 collects the feedback and associates the feedback with the rest of the data saved from the first study session $S_1$. Processing of the type performed at step 108 can proceed similar to the processing at steps 114, 116, 118, 120 and/or 122 as described in more detail below.

At step 110, the user U can be awarded an incentive for the completing the first study session $S_1$. The incentive can be based, for example, on the amount of time spent on the first study session $S_1$ and/or the number of distractions detected during the first study session $S_1$. For example, the incentive can be based on a value calculated proportional to the length of the first study session $S_1$. Additionally, the time spent on distractions and/or number of distractions during the first study session $S_1$ can be counted against the incentive. For example, an incentive value ($I_N$) can be calculated as using one or more of the following equations based on study time ($T_S$), distraction time (TD) and/or number of distractions ($D_N$). In the below equations, X, Y and Z can be variables determined by the system 10.

$$I_N = X(T_S)$$

$$I_N = X(T_S) - Y(T_D)$$

$$I_N = X(T_S) - Z(D_N)$$

In an embodiment, for example as illustrated in FIGS. 5 to 20, the incentive can be based on a game-like construction. Here, the game-like construction has a "space exploration" motif in which the user U receives an award such as virtual "fuel cells," for example, in an amount proportional to the length of each study session S completed. After earning a sufficient quantity of fuels cells, the user U can exchange their fuel cells for "planets" that are offered for trade with differing frequency. In collecting such planets, the user U is able to progressively fill up a "galaxy" of planets. As a user U progresses in earning fuel cells, more rare planets (i.e., less frequently presented planets) are made available for trade. As illustrated by the dotted line at step 110 of method 100, after being awarded an incentive, the user U can view their progress within the game model at step 112 (e.g., review their progress in collecting the various available planets). In this manner, the user U can be provided with an external and more immediate incentive to successfully complete study sessions S. Further still, by making the user U's respective incentive awards viewable by others (e.g., other users $U_1$, $U_2$ . . . $U_n$ can view the user U's progress in building a galaxy), the user U is further incentivized the continue earning rewards through the completion of study sessions S. The method 100 can then return to step 102, where the user U can establish a new task, i.e., tag 60 and/or initiate a new study session S.

At step 114, the user U can choose to take a break from studying. Here, a break timer can be presented to the user U via the GUI 25. The GUI 25 can suggest an optimized break length, for example, based on a weighted average of past breaks. In an embodiment, when the user U has already completed a plurality of study sessions S, the system 10 can determine an optimal break time by considering the break times of the user U's most successful past study sessions S as determined, for example, by the methods discussed herein. For example, the break times during study sessions S with less distractions and/or higher overall satisfaction from the user U can be weighted more heavily in determining an optimal break time for the user U.

The GUI 25 can also present the user U with one or more option to modify the length of the break. Once the break session is initiated by the user, the timing device 52 is again initiated and the break session begins elapsing. Either prior to initiating the break session, or during elapse of the break session, the user U can be given the opportunity to provide feedback on the first study session $S_1$ at blocks 116 and 118.

At step 116, the GUI 25 can ask the user U to provide an assessment of the length of time for the first study session $S_1$. In an embodiment, the user U can be provided with a fixed scale and/or selectable options to provide quick feedback concerning the length of time (e.g., "too short," "just right," "too long"; or "select from one to five, with one corresponding to too short an five corresponding to too long", etc.). The feedback can then be converted to one or more first numerical values based on one or more input given by the user U.

Similarly, at step 118, the GUI 25 can provide the user U with a fixed scale and selectable options such that the user U is able to assess performance during completion of the study session (e.g., "I performed well," "I performed adequately," "I performed poorly"; or "select from one to five, with one corresponding to poor performance and five corresponding to excellent performance," etc.). The feedback can then be converted to one or more second numerical values based on one or more input given by the user U. Those of ordinary skill in the art will also appreciate from this disclosure that other types of assessment techniques (e.g., free form text descriptions) can be employed for this purpose.

Here, the user U can also be presented with one or more question regarding the subject matter studied. The one or more question can be generated from the study material used by the user U during the session, or the one or more question can be preloaded by a teacher or tutor and/or stored from a previous study session S. An example technique for assessing the success of a given study session, based on a question-and-answer session derived from the material being studied, is described in further detail below relative to FIG. 4. The user U's answers to the questions can then be converted to one or more second numerical values based on one or more input given by the user U. Additionally, the time taken by the user U to provide answers to the questions can also be taken into account when converting the answers to one or more second numerical values. At step 120, the one or more first and second numerical values from the feedback data received at steps 116 and/or 118 can be collected and associated with the corresponding study session data collected at steps 102 and/or 104. For example, each study session $S_1, S_2 \ldots S_n$ can be maintained as a separate record associated with the user U, or an entry in a record corresponding to the user U, with the above-noted data (session length, tags, feedback data) comprising separate data elements within such records. Regardless of the manner in which the data is maintained, a timer parameter optimization process can be performed at step 122 based on the data collected for each study session S initiated by the user U.

In an embodiment, the timer parameter optimization process can be accomplished through the use of a Super-Memo-2 (SM-2) algorithm. For example, to begin, all concepts being studied (e.g., tags 60) can be associated with an equal easiness factor (EF). Studying of a given concept can be performed using one or more intervals (e.g., I(n)), wherein for a given n number of intervals, $I(n):=I(n-1)*EF$. In this example, I(n) is inter-repetition interval after the $n^{th}$ repetition (in days), and EF is the easiness factor for a given concept to be studied. If an interval is calculated as a fraction, the fraction can be round up to the nearest integer. After each repetition, the quality of repetition response can be assessed on a numerical grade scale (e.g., $0 \le EF \le 2$ EF), for example, in which 0 represents a poor score and 2 EF represents a maximum score on the grade scale. After each repetition, the easiness factor can be recalculated and reset based on the grade, and the new easiness factor can be used to optimize study sessions based on the associated subject.

For example, applying the above embodiment with example numerical values, the SM-2 algorithm can be implemented as follows. For all concepts being studied, the easiness factor can begin at 2.5. Studying of a given concept can be performed using the following intervals:

$I(1):=1$ $I(2):=6$ for n>2: $I(n):=I(n-1)*EF$ where:

I(n) is inter-repetition interval after the $n^{th}$ repetition (in days); and

EF is the easiness factor for a given concept to be studied.

If an interval is calculated above as a fraction, the fraction is round up to the nearest integer. After each repetition, the quality of repetition response is assessed on 0-5 grade scale, where:

5—(e.g., perfect response, correct answer to question with no hesitation, self-assessment of preforming well, or other positive feedback)

4—(e.g., correct response after a hesitation)

3—(e.g., correct response recalled with serious difficulty)

2—(e.g., incorrect response; where the correct one seemed easy to recall)

1—(e.g., incorrect response; the correct one remembered)

0—(e.g., complete blackout, no answer, self-assessment of performing poorly, or other negative feedback).

The quality can be assessed based on user feedback as discussed above (e.g., self-assessment, answers to questions, or other methods.) After each repetition, the easiness factor of the recently repeated concept can be modified according to the formula:

$$EF':=EF\pm(0.1-(5-q)*(0.08+(5-q)*0.02))$$

where:

EF'—new value of the easiness factor,

EF—old value of the easiness factor, q—quality of the response in the 0-5 grade scale.

If new value of the easiness factor is less than 1.3 (representing the maximum "hardness" or difficulty), then the new easiness factor can be set to be 1.3.

If the quality response was lower than 3, the repetitions can then start from the beginning without changing the easiness (i.e. use intervals I(1), I(2) etc. as if the concept was being studied anew). After each repetition session of a given day, all concepts that scored below four in the quality assessment can be repeated again. The repetitions can continue until all of these concepts score at least 4.

The above process can be performed using various data collected during the method 100. For example, the above process can be performed using the first and second numerical values from the feedback data received at steps 116 and/or 118 (e.g., using grades determined from study questions provided by a teacher or tutor and/or in accordance with FIG. 4 as detailed below).

In an embodiment, the outputs provided at step 122 can be used to optimize future study sessions S and/or provide recommendations for when certain subject matter or concepts (as identified by the user-provided tags) should be studied next by the user U. This is illustrated by the dotted line from step 122, where the results computed at step 122 can be employed the next time the user U initiates a timer.

At step 122, the system 10 can perform one or more optimizations for one or more subsequent study sessions $S_n$ based on the previously collected data, including for example, the session time, tags, first and/or second numerical values from the feedback data received at steps 116 and/or 118 as described above or in accordance with FIG. 4 as detailed below. For example, the system 10 can determine whether the time spent on the first study session was effective based on one or more numerical values/grades, and can determine whether a subsequent study session $S_n$ should be shortened or lengthened. For example, the system 10 can evaluate a subsequent study session S by weighting a plurality of previous study sessions S based on the numerical values/grades. For example, an optimized time period for a subsequent study sessions $S_n$ can be calculated as follows:

$$Sn=(W_1S_1+W_2S_2+W_mS_m)/m$$

In the above example, m represents the number of previously study sessions S being considered, $S_1$, $S_2$, $S_m$ represents the time length of those study sessions, and $W_1$, $W_2$, $W_m$ represent weights based on the effectiveness of those study sessions. The study sessions being considered can include for example, all previous study sessions or a group of previous study sessions associated with one or more particular tag 60.

System 10 can also perform one or more optimization for one or more subsequent study sessions $S_n$ to determine an optimal time of day and/or day of the week for the subsequent study session $S_n$. For example, based on one or more numerical value/grade as determined according to the methods discussed herein, the system 10 can determine that the user U has an optimal time and/or day to study based on the number of distractions during similar periods and/or by how the user performs on questions related to the study sessions S during similar periods.

In an embodiment, the system 10 can schedule a subsequent study session $S_n$ in the user U's digital calendar 50 based on one or more of the above criteria. For example, if the system 10 determines that the user U's optimal study time is 30 minutes, and that the optimal time of day is 3:00 pm based on the number of distractions and/or scores that the user U receives after study sessions S at similar times of day, the system 10 can schedule a subsequent study session $S_n$. Accordingly, the system 10 can remind the user U at 3:00 the next day to begin a new 30 minute study session, or the system 10 can automatically begin a new 30 minute study session S at that time. In this way, the system 10 can ensure that the user U makes the most out of the time spent studying on any given day.

In an embodiment, the user U can set the system 10 to ensure that the user U studies for a desired amount of time over a particular period. If the user U has already completed one or more study session S, the system 10 can optimize the user's schedule so that the user U completes the desired amount of time over the particular period using optimal amounts of time for each study session, at the optimal time of day, and/or on optimal days of the week, such that the total amount of time studying over the particular period equals the desired time for that period.

For example, the user U may wish to study for 3 hours over a given week. In this example, the user has completed previous study sessions S such that the system 10 has calculated an optimal study length of 30 minutes and an optimal study time of 3:00 pm. The system 10 can therefore determine the user U's optimal study schedule to include 6 separate 30 minute sessions at 3:00 pm on six days of the week. Here, the system 10 can further determine that one day of the week is worst for the student based on distractions and/or performance and can schedule the sessions for the other 6 days of the week. The system 10 can further input this schedule into the user U's digital calendar 50 and/or set reminders for upcoming study sessions S.

The system 10 can further update the user U's digital calendar 50 as the week goes on. For example, the user U's studying habits can change with any given study session S, such that the optimal times and lengths can change as time goes on. Here, the system 10 can recalculate one or all of the above values/grade after each study session S so that each subsequent study session S is fully optimized. For example, as time goes on, the user U may become an effective studier over longer periods of time. In this example, the system 10 would continuously increase the study sessions as the user U becomes more effective at longer lengths. In an embodiment, the system 10 can calculate the above values/grades based on a predetermined number of the most recent study sessions S, ensuring that the optimal parameters are always up-to-date and not based on historical data that is too far in the past to be relevant to the user U's current status.

Additionally, if the user U misses a study session S once a study schedule has been set, the system 10 can further update the schedule for a particular period to ensure that a desired amount of study time is still completed for that period. For example, the system 10 can either increase the length of future study sessions S over that period, add additional sessions, and/or adjust the day or time of sessions. Here, the system 10 can use the optimizations above, for example, to determine whether a length of time or a time of day is more important to how the user U scores on grading after a study session. If the system 10 determines that the user U scores higher at certain times regardless of the length of the study session S, for example, then the system 10 can adjust the user U's schedule by lengthening subsequent study sessions at that time or adding more study sessions at that time. On the other hand, if the system determines that the user U scores higher over a particular length of time regardless of the time of day, for example, then the system 10 can schedule additional sessions using that particular length of time regardless of the time of day of the sessions.

Further still, by accessing the user U's digital calendar 50, the system 10 can ensure that the scheduled study sessions do not conflict with the user U's other conflicts. Here, the system 10 can further optimize the user U's study schedule while taking other conflicts into account. For example, if an optimal time/length conflicts with the user U's schedule, the system 10 can determine whether to prioritize time or length in determining when to schedule a subsequent study session S. In this way, the system 10 can optimize the user U's schedule to the extent possible while taking into account the user U's other conflicts.

In another embodiment, if a new user U logs into the system 10, the system 10 can begin the optimization of a desired amount of time over a particular period after the user U completes one or more of a predetermined number of study sessions S. That is, the system 10 can begin to optimize the user U's schedule as discussed herein after completion of a first study session $S_1$, and can continue to optimize the user U's schedule after each subsequent session $S_n$ to ensure that the desired amount of study time is met over the particular period.

In a single or group studying scenario, the optimization information determined at step 122 can further be provided to a teacher or tutor so that subsequent study sessions can be improved. For example, if some students scored better on questions at the end of a particular study session S when adding additional time during the study session S, the teacher or tutor can determine that additional time is needed for a particular subject and/or student for subsequent study sessions. The teacher and/or tutor can also use the day/time information to determine when a student is best suited to perform subsequent study sessions and get the most out of those study sessions. Additionally, the teacher or tutor can consider the particular study materials of successful students and send those to unsuccessful students, as discussed in more detail below.

Figure 4:
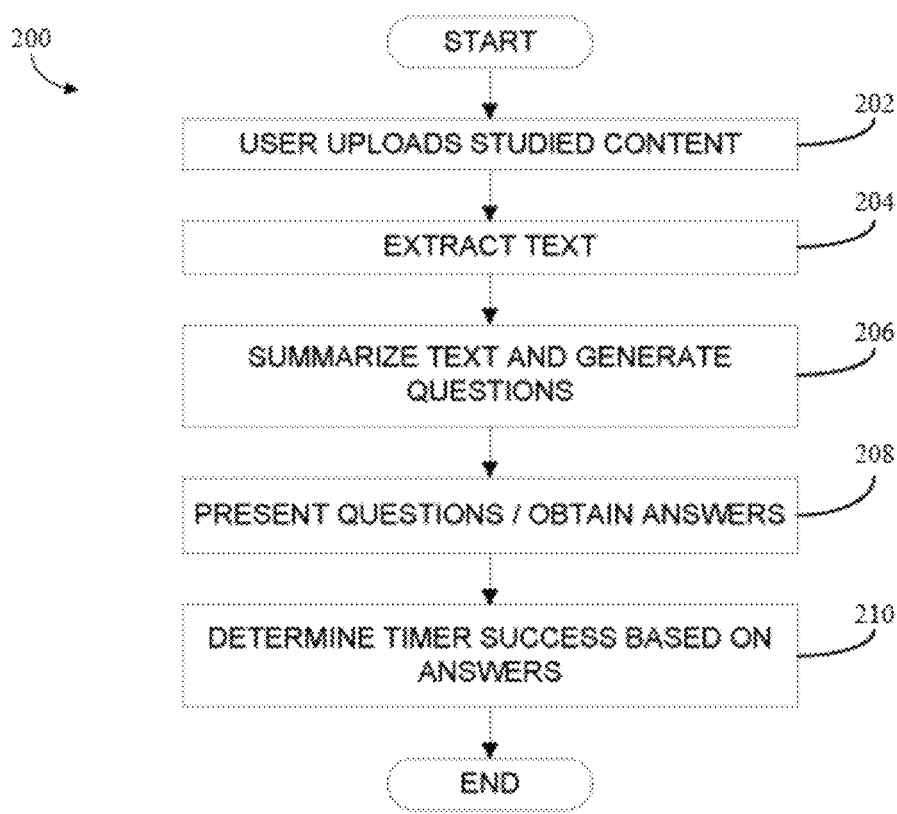
FIG. 4 illustrates an example embodiment of a method for accepting user feedback which can be utilized during the method for optimizing study sessions of FIG. 3.

FIG. 4 illustrates an example embodiment of a method 200 for accepting user feedback at step 118 in method 100. In particular, FIG. 4 illustrates a method whereby a user can perform a self-assessment of the materials just studied to provide feedback regarding the recent study session. Some or all of the steps of method 200 can be stored as instructions on the central memory 22 and/or terminal memory 32 and can be executed by the central processor 20 and/or terminal processor 30 in accordance with the respective instructions stored on the central memory 22 and/or terminal memory 32. It should be understood from this disclosure that some of the steps described herein can be reordered or omitted without departing from the spirit or scope of method 200.

At step 202, the user terminal 14 presents the user U with a GUI 25 allowing images 62 of the material just studied to be uploaded into the system 10. For example, the user U can upload images 62 of a textbook that includes the material studied during a study session S by taking a photograph of the textbook material with the image recording device 54 associated with the user terminal 14. In an embodiment, the user terminal 14 can permit the user U to view and approve the images 62 before performing additional analysis of the images 62 and/or moving on to step 204. The user terminal 14 can also examine the images 62 for clarity before performing additional analysis.

At step 204, text can be extracted from the uploaded images 62, e.g., using an optical character recognition (OCR) process. Here, the OCR process converts the text from the uploaded images 62 into machine-encoded text which can be further processed according to the methods discussed herein. Those of ordinary skill in the art will appreciated from this disclosure that there are various ways to convert the text from the uploaded images 62 into machine-encoded text.

At step 206, the system 10 analyzes the extracted text to summarize and generate questions based on the extracted text. In an embodiment, the system 10 first removes any special characters or digits from the text being analyzed. The words in the text can then be tokenized and labeled with their respective parts of speech. The system 10 can then assign a score to one or more words or sentences in the text to determine which words or sentences should be deemed the most valuable or applicable to the studied subject.

In an embodiment, the words in the text can be processed using a frequency-inverse document frequency (tf-idf) algorithm, enabling the relative importance of each word in the text to be determined. For example, weights can be assigned to each word according to the magnitude of the vectors obtained from a tf-idf algorithm. In an embodiment, a value can be generated for one or more words in the text, wherein the value increases proportionally to the number of times a word appears and/or where in one or more sentence the word appears. The value can then be converted to a numerical weight, for example, to a numerical value between 0 and 1. Alternatively, a value can be generated based on the part of speech of each word (e.g., noun, verb, adjective). In an embodiment, the value can be generated based on one or more of the part of speech, the number of occurrences, the placement within one or more sentence, and/or the resulting sentence's placement in an uploaded image 62.

With a value calculated for one or more of the most important words in the text, a score can be calculated for each sentence in the text. In an embodiment, the most important sentences in the text can be those sentences having the highest average tf-idf scores or other scores. Based on this ranking of sentences, the top N sentences (e.g., where N=7) for the text can be identified and reproduced as a summary of the text. The user U can then use this summary when reviewing the materials and/or repeating the same or a similar study session S at a later date.

The system 10 can further formulate study questions based on the text extracted from the uploaded images 62. In an embodiment, the questions can be formed, for example, by taking into account the values attributed to individual words and/or the scores attributed to sentences as described above. In another embodiment, or in combination with using the values/scores, questions from the text can be formulated by identifying, in each sentence, all proper nouns (which can be ranked according to their relative importance scores). Questions can then be formed from sentences by presenting the sentence in "fill in the blank" form, e.g., in which various ones of the nouns are blanked out and the user is asked to provide the missing words. The specific nouns to be blanked out can be chosen randomly or according to their relative importance based on the value determined above. For example, from a calculus textbook, the following sentence is provided: "If a plane area is revolved about a line that lies in its plane but does not intersect the area, then the volume generated is equal to the product of the area and distance traveled by its center of gravity." This sentence includes the following nouns/noun phrases: "plane area," "line," "plane," "area," "volume," "product," "distance" and "center of gravity." Thus, a question based on this sentence might read: "If a plane area is revolved about a line that lies in its plane but does not intersect the area, then the _____ generated is equal to the product of the area and distance traveled by its _____."

At step 208, questions generated at step 206 can be presented to the user U via the GUI 25 of the user terminal 14, and the user U can be enabled to provide answers. Based on the number of correct answers provided to the questions, a metric of success (e.g., percentage of blanks correctly filled in, etc.) can be determined at step 208 for the study period being assessed. Thereafter, as described above relative to FIG. 3, numerical values based on the resulting success metric can be incorporated into the optimization at step 122 which is used to optimize future study sessions S.

In an embodiment, the numerical values can be calculated based on both the user U's answers to the questions and the values attributed to individual words and/or the scores attributed to sentences as described above. In this way, the user U can be graded higher for answering correctly on more important sentences or relating to more important words as determined by the system 10.

In an embodiment, the extracted questions determined in accordance with method 200 can be combined with questions preset by a teacher, tutor or another third party. All of the questions can then be used by the system 10 to determine the effectiveness of the study session S. For example, if the user U scores well on extracted questions but poorly on preset questions, then the system 10 can determine that the user U studied effectively during the study session but that perhaps the material being studied was not directed to the intended subject. Likewise, if the user U scores poorly on the extracted questions, then the system 10 can determine that the user U was not effective at studying the particular material imaged from the study session S and thus the material itself may not be the problem. In this way, the system 10 can determine whether poor scores are related to the material studied or other factors. If the material studied is insufficient, the system 10 can further recommend alternative material based on images 62 uploaded by another user U using another user terminal 14 under the same study tags 60.

Referring now to FIGS. 5 to 20, various examples of the GUI 25 during performance of the above steps are illustrated. In the illustrations shown in FIGS. 5 to 20, the term "nova" is used to refer to a study session S which pairs elapse of a timing device 52 with the user-provided tags 60 as described above.

Figure 5:
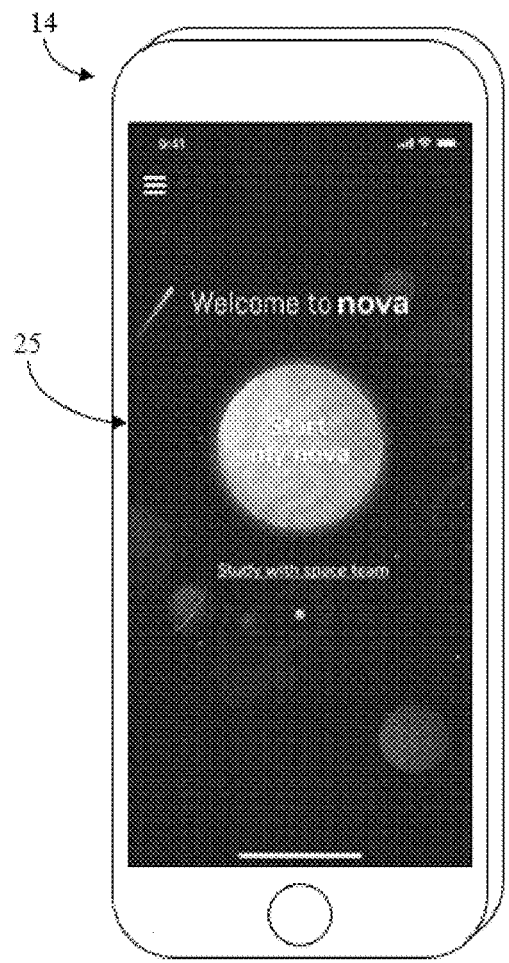

At FIG. 5, the GUI 25 of a user terminal 14 is displaying a home screen that can be provided after a user U has signed into the system 10. As shown, the user U is provided inputs that permit the user U to begin a new individual study session or a group session (i.e., a group session with a "space team" in the illustrated example in keeping with the above-described "space" incentivization motif).

Figure 6:
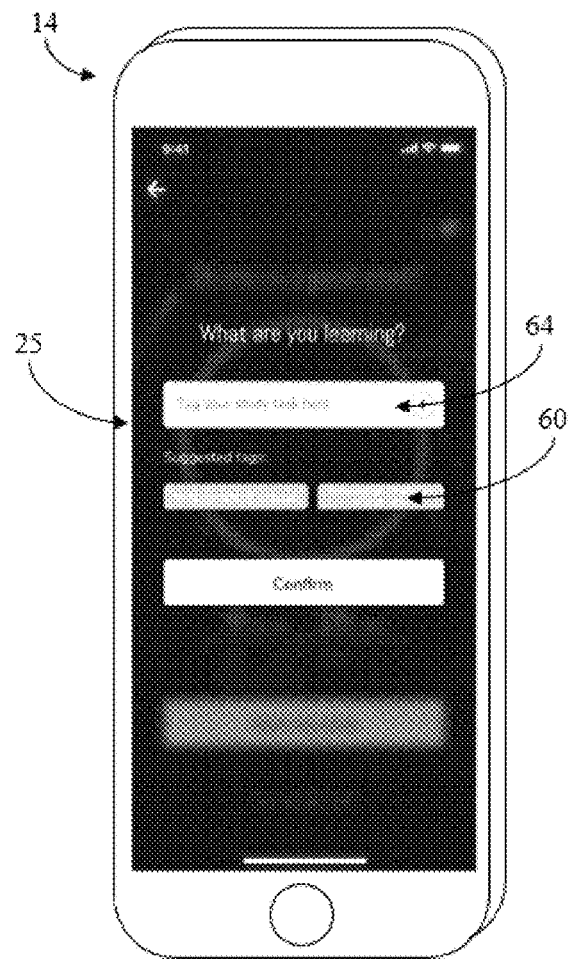

At FIG. 6, the GUI 25 of the user terminal 14 is displaying a text input box 64 that allows the user U to create his/her own tags 60 that are, ideally, descriptive of the subject matter or concepts to be studied during the next study session S. As further shown, suggested tags 60 can also be provided as described previously. Once all desired tags 60 have been provided, the user U is able to confirm their selections as shown.

Figure 7:
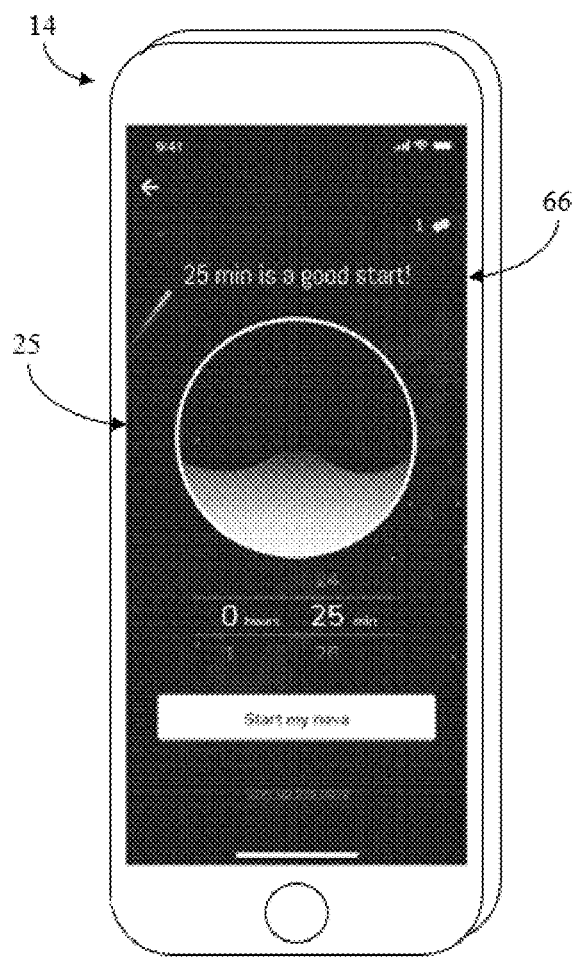

At FIG. 7, the GUI 25 of the user terminal 14 presents the user U with a suggested time length 66 for the next study session S. As described above, the suggested time length 66 can be based on the parameter optimization performed at step 122 of method 100 during previous study sessions S. In an embodiment, the suggested time length 66 can be based on the tags 60 assigned to the current study session S. As further shown, the GUI 25 enables the user U to adjust (increase or decrease) the suggested timer length 66. Thereafter, the user U can select a button that initiates elapse of the timing device 52. Here, the system 10 can further suggest specific study materials used during successful study sessions by other users U who used the same tags 60.

At FIG. 8, the GUI 25 of the user terminal 14 is illustrated during elapse of the timing device 52 and includes a countdown timer showing time remaining for this study session. Further, the tags 60 provided by the user U at the beginning of the study session S are displayed with the option to remove each such tag 60. Removing one or more tag 60 can be useful when the user U, during a study period, realizes that the initially provided tags are insufficiently descriptive, mis-descriptive, etc. of the material being studied. Further still, a text input box can allow the user U to enter new tags during the study interval, as can become necessary as the user U better appreciates the nature of the subject matter being studied.

In a similar vein of allowing the user U to modify the study session during elapse of the timing device 52, FIG. 9 illustrates the GUI 25 of the user terminal 14 allowing the user U to increase the length of the current study session S. In the illustrated embodiment, the user is provided with pre-defined buttons 68 that permit the addition of either 5 or 10 more minutes. However, it should be appreciated from this disclosure that other input mechanisms can be used for this purpose. Further, both FIGS. 8 and 9 illustrate an option (toward the bottom of each user interface) that permits the user to "Give up this nova," i.e., to terminate the current study session S. In an embodiment, an abandoned study session S can be treated as a non-event and not used for purposes of the optimization at step 122 for future study sessions S. Alternatively, an abandoned study session S can be used during the optimization at step 122 to determine that the particular time of day or day of the week is not optimal for the user U to perform a future study session S.

At FIG. 10, the GUI 25 of the user terminal 14 indicates the completion of the current study session S. As shown, the user U is informed of an award earned for completion of the study session S. The earned award can be determined in accordance with the methods discussed above. The user U can also be provided, in accordance with the processing illustrated by method 200, an option to initiate an upload of the material studied during the study session so that an assessment can be performed in accordance with the methods discussed herein.

If the user U chooses to upload material, the user U can operate the image recording device 54 of the user terminal 14 to photograph one or more images 62 of the study material used by the user U during the study session S. At FIG. 11, the GUI 25 enables the user U to view the images 62 taken and confirm that they are suitable for upload, for example, into the database 26. If saved, then the images 62 can be recalled by the user U, for example, if the user U wishes to study the same material at a later date and/or compare a later study session S. The saved images 62 can further be used to improve the study sessions S of other users U as described herein.

Figure 12:
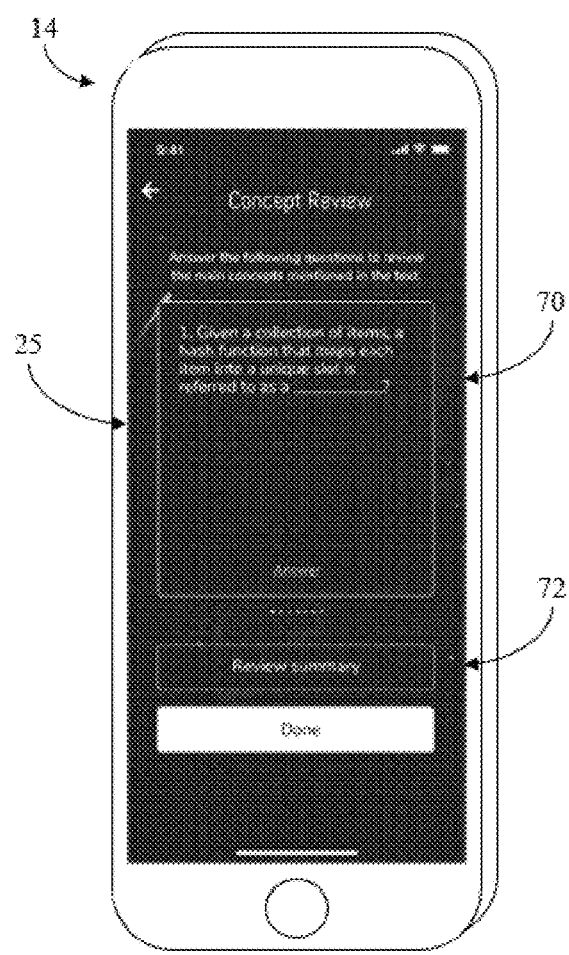

At FIG. 12, the GUI 25 of the user terminal 14 has presented a question 70 for the user U based on the uploaded study materials. The question 70 can be derived, for example, based on the images 62 according to method 200 described above. Alternatively or additionally, the question can be preset by a teacher, a tutor, and/or the system 10. As further shown, the GUI 25 can further provide the user U with a button 72 that will display a summary of the studied materials, for example, as described above with respect to method 200.

Figure 13:
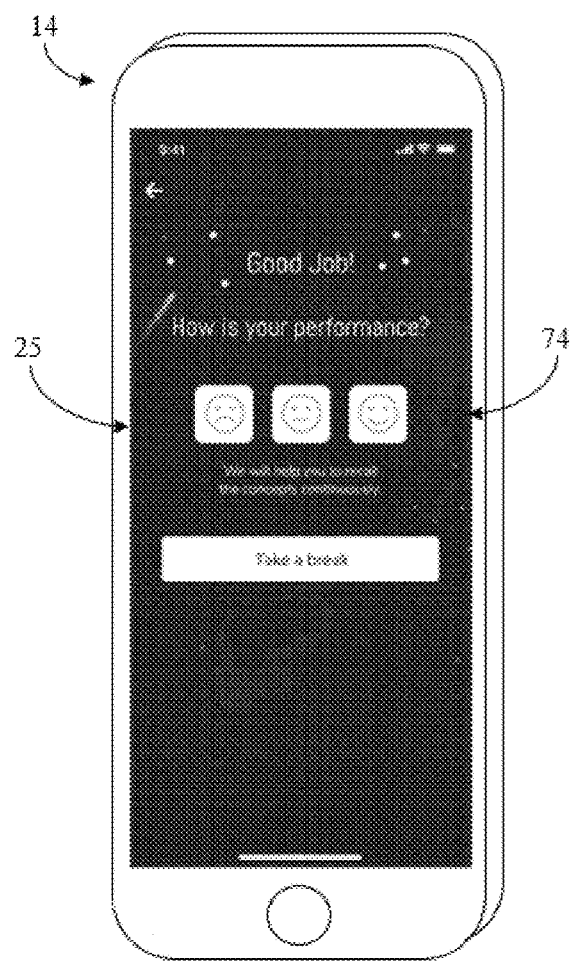

FIG. 13 illustrates an alternative GUI 25 of the user terminal 14 which permits the user U to self-assess his or her performance during the study session S through the selection of various icons 74 illustrating varying degrees of satisfaction (i.e., a "smiling," "neutral" or "frowning" face icon). The user's selection can be used, for example, during the optimization at step 122 to optimize future study sessions.

Here, the GUI 25 also enables the user U to select an option to take a break from studying.

Figure 14:
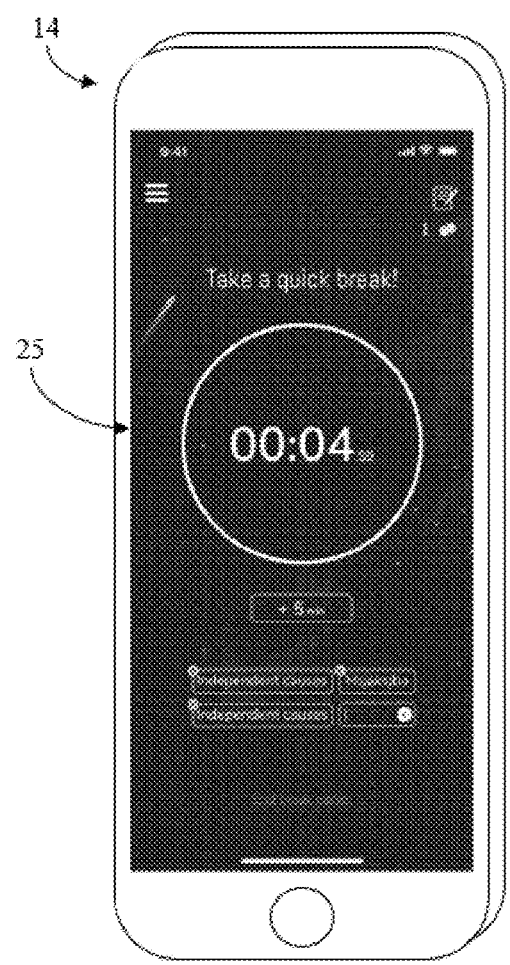

At FIG. 14, after selecting the break option in FIG. 13, the GUI 25 of the user terminal 14 presents the user U with an elapsing timer illustrating the remaining length of the break period. As in the case of a study session S, the GUI 25 can also include an option to extend the length of the break.

Figure 15:
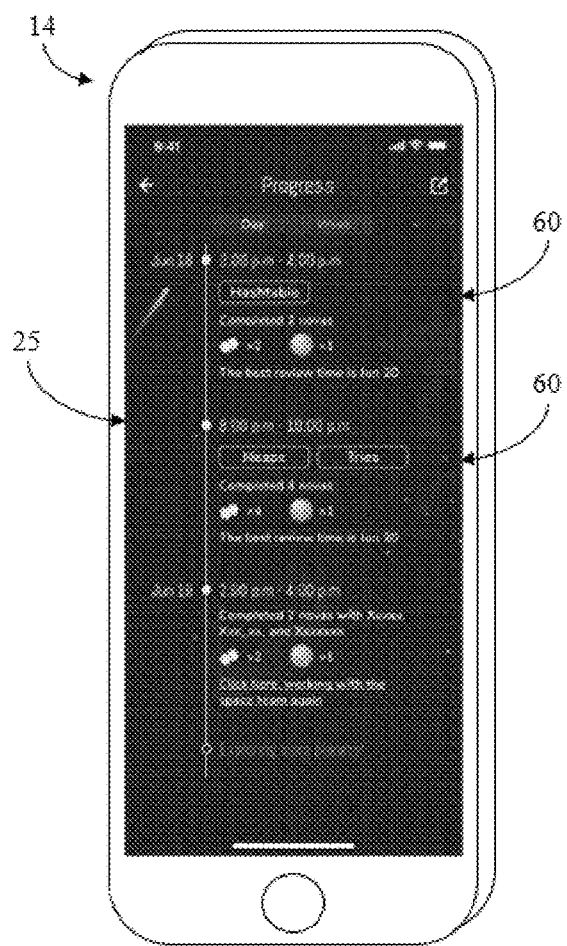
Figure 16:
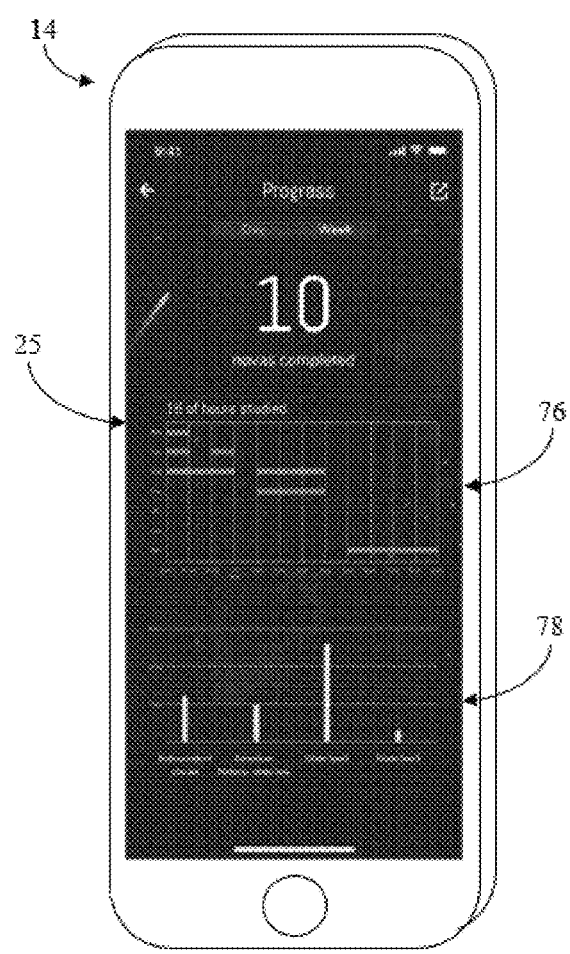

FIGS. 15 and 16 illustrate example embodiments of the GUI 25 of the user terminal 14 displaying progress made by the user U during the recently completed study sessions S and/or previous study sessions S. FIG. 15 illustrates progress by the user U in the form of a daily timeline illustrating the particular study sessions S completed, the tags 60 associated with those study sessions S, and the rewards earned for completing those study sessions S. As further shown, each of the summaries can include at least a portion of the recommended study parameters and indicate the best time to repeat a study session S for one or more concepts (e.g., the best review time for the "Hashtable" concept as tagged by the user U is June 20 as determined by the system 10). Alternatively, FIG. 16 illustrates the progress by aggregating results into a weekly presentation. As shown in FIG. 16, the aggregated data can be illustrated in a Gantt chart-like format 76 showing when study sessions were completed during the week, or in vertical bar chart format 78 illustrating the number of hours studied according to the specific tasks.

Figure 17:
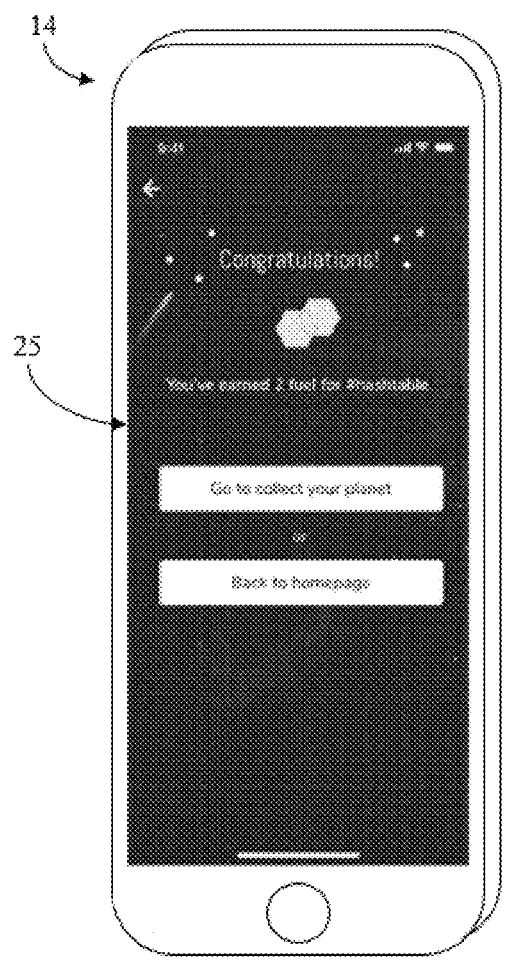
Figure 18:
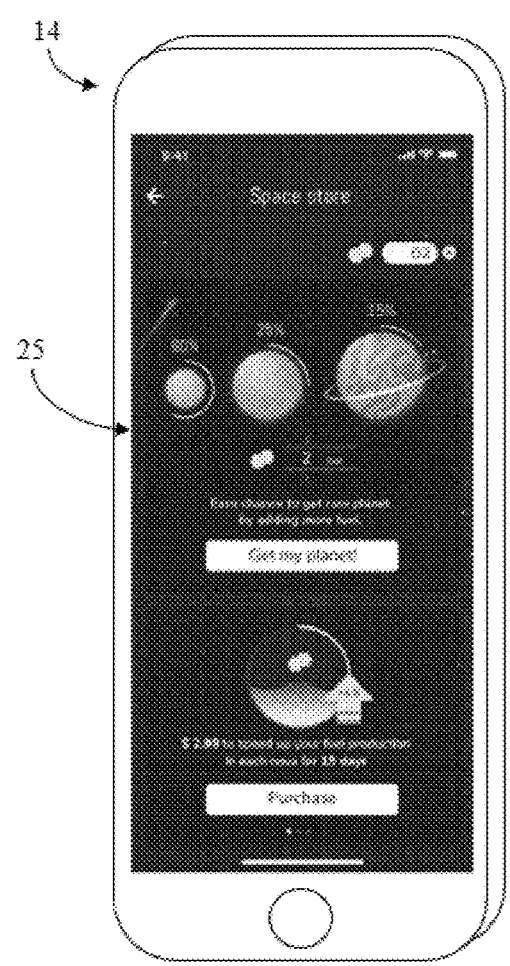

FIGS. 17 and 18 illustrate example embodiments of the GUI 25 of the user terminal 14 displaying aspects of the above-described incentivization system. In FIG. 17, the GUI 25 informs the user U of a reward for completion of a recent study session, and further provides the user U with a selection mechanisms that allow the user U to exchange the earned rewards ("Go to collect your planet") or to return to the homepage (e.g., FIG. 5). Upon choosing the option to exchange an earned reward, the GUI 25 can present the user U with the GUI 25 as shown for example in FIG. 18, in which various types of redemption rewards (here, "planets") that can be obtained by the user U are displayed. As shown in the illustrated embodiment, the user U can state how many earned rewards (e.g. "fuel") they are willing to spend, and the percentages next to each redemption reward (e.g., "planet") illustrate the likelihood that the user U will receive that redemption reward, which percentages change depending on how much fuel the user U is willing to spend. In this manner, the bigger/rarer redemption rewards (e.g., "planets") are more likely attainable the more willing the user U is to exchange the earned rewards. As further shown in FIG. 18, the GUI 25 can also provide an option whereby the user U can purchase increased rewards, e.g., in the form of increased reward proportionality per unit of time spent for a given period of days.

Figure 19:
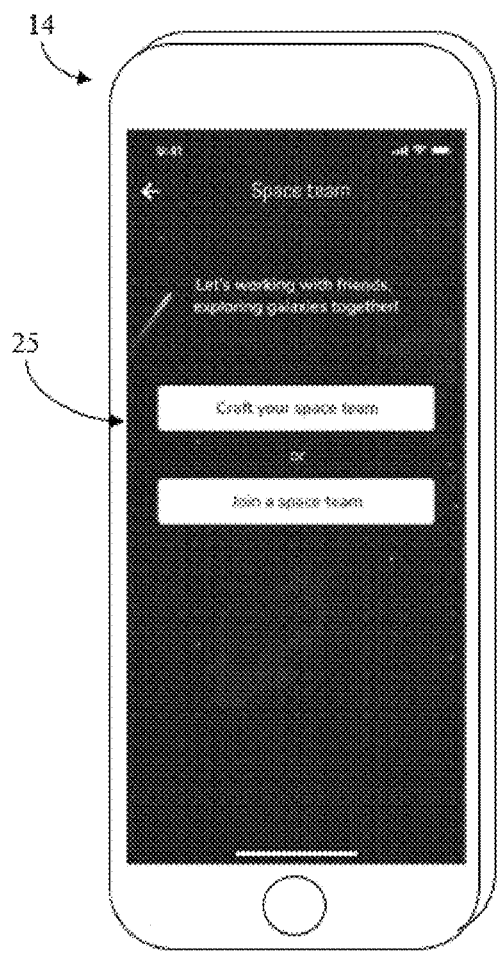
Figure 20:
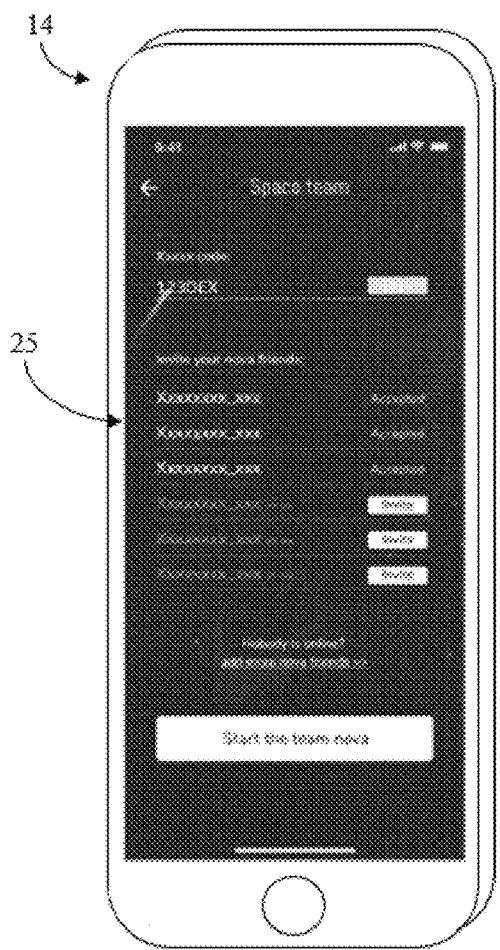

FIGS. 19 and 20 illustrate example embodiments of the GUI 25 presenting the user U with buttons whereby the user U can either set up a group study session ("Craft your space team") or join a group study session ("Join a space team"). In this embodiment, when the user U selects "Craft your space team," a team is created and a group code (FIG. 20) is established for the new team. The user U that created the group (administrative user) can share the group code with other users identified by the administrative user to invite such other users $U_1, U_2 \ldots U_n$ to the group. The administrative user has full authority over the group, which includes sending invites, removing members, and destroying the group. In an implementation, the group is destroyed when the administrative user leaves the group or there are no members in the group. In an embodiment, the user U can challenge other users $U_1, U_2 \ldots U_n$ to complete a study session having the same lengths or tags as one or more of the user U's previous study sessions and/or transit summaries or questions to other user terminals 14*a*, 14*b* . . . 14*n*.

In an embodiment, the group study function can be used as a tool for teachers/tutors and students. For example, the teacher or tutor can be the administrative user creating the group, and the students can be invitees who perform the study sessions. In this embodiment, the teacher can set tags for the intended study subjects, set questions for the end of an intended study session, and/or ensure that each student studies for a desired amount of time over a particular period. The teacher can further determine whether the students are completing the studying without distractions, and can optimize the students' time by allowing the system 10 to set the students' study schedules.

When used in this way, the teacher or tutor can determine study lengths and/or materials that are most effective for a given subject by assessing the students' scores to the questions at the end of the study session. If a student performs well, then the teacher/tutor can determine the total time spent by the student and/or the study material photographed (e.g., at step 202 above) to be ideal for studying a particular tagged subject. The images 62 taken by the successful student can then be sent to the rest of the students to help with their studying of the subject.

In an embodiment, each student can be presented with a combination of extracted first questions determined in accordance with method 200 and preset second questions determined by a teacher, tutor or another third party. All of the questions can then be used by the system 10 and/or teacher/tutor to determine the effectiveness of the study session S. For example, if the user U scores well on extracted first questions but poorly on preset second questions, then the system 10 and/or teacher/tutor can determine that the user U studied effectively but needs better material. Likewise, if the user U scores poorly on the extracted questions, then the system 10 and/or teacher/tutor can determine that the material itself is not the problem. In this way, the system 10 and/or teacher/tutor can determine how to improve the study session to get more out of the student.

In an embodiment, the system 10 can grade a plurality of students based on the questions at the end of the study period or other criteria, and can automatically send the images 62 taken by the highest grading student(s) to the rest of the students. In this way, the system 10 can determine which study materials are the most effective and use those most effective study materials to enhance the study sessions S of all students involved in the group and/or future students who perform similar study sessions. In an embodiment, the central memory 22 can include at least one neural network which can be trained to analyze the images 62 uploaded by each user U and determine whether that user U is studying effectively using beneficial study material. Here, the neural network can be trained using images uploaded by various users $U_1, U_2 \ldots U_n$ and/or the corresponding study times and/or answers to questions at the end of a study period. Through the training process, the neural network can detects pattern within the content which the neural network can then identify in future images uploaded by subsequent users $U_1, U_2 \ldots U_n$. The neural network can also continuously train when new images 62 are uploaded. For example, each time a user U scores well at the end of a study session, the images 62 uploaded by the user can be used as a positive example for the neural network. Likewise, each time a user U does not score well at the end of a study session, the images 62 uploaded by the user can be used as a negative example for the neural network. In this way, the neural network can evaluate subsequent images 62 uploaded by users U and make recommendations to the teachers, tutors, or students regarding whether different study materials should be used in relation to one or more tag 60. In an embodiment, the central server 12 can store the images 62 of study materials used by successful students and use those images 62 as a recommendation to replace study materials determined to lead to lower scores. In another embodiment that utilizes a group study function, the students can work together to achieve the rewards discussed above. For example, the students can be required to all complete a certain study session S or achieve a certain score at the end of a study session S to receive rewards. Additionally, the system 10 can enable the students to combine awards (e.g., to combine "fuel" so that multiple students receive a certain "planet" simultaneously).

The group study and/or quiz taking function is advantageous, for example, because different students requiring varying amounts of time to study and/or take quizzes. By using the methods discussed herein, the study time can be optimized for each particular student, as monitored by a teacher or tutor, to ensure that each student receives the needed amount of time to complete a particular subject. The teacher or tutor can further use the methods discussed herein to pinpoint one or more reason why a student is not studying effectively (e.g., not enough time, insufficient study materials, too many distractions, etc.).

The embodiments described herein provide improved systems and methods for in optimizing study habits and efficiency of study time through the provision of personalized study sessions. By condensing the data using the various calculations discussed herein, processing speeds can be increased and memory space can be conserved. Additionally, the systems and methods enable optimal study sessions by continuously evaluating a user's studying characteristics and suggesting optimized parameters for future sessions. It should be understood that various changes and modifications to the system and method described herein will be apparent to those skilled in the art and can be made without diminishing the intended advantages.

General Interpretation of Terms

In understanding the scope of the present invention, the term "comprising" and its derivatives, as used herein, are intended to be open ended terms that specify the presence of the stated features, elements, components, groups, and/or steps, but do not exclude the presence of other unstated features, elements, components, groups, integers and/or steps. The foregoing also applies to words having similar meanings such as the terms, "including", "having" and their derivatives. Also, the terms "part," "section," or "element" when used in the singular can have the dual meaning of a single part or a plurality of parts. Accordingly, these terms, as utilized to describe the present invention should be interpreted relative to a connecting device.

The term "configured" as used herein to describe a component, section or part of a device includes hardware and/or software that is constructed and/or programmed to carry out the desired function.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such features. Thus, the foregoing descriptions of the embodiments according to the present invention are provided for illustration only, and not for the purpose of limiting the invention as defined by the appended claims and their equivalents.

What is claimed is:

1. A system for optimizing one or more study sessions for a user, the system comprising:
a graphical user interface configured to accept input from the user regarding a first study session;
a timing device configured to elapse for a first amount of time during the first study session;
a neural network configured to analyze images of study material; and
a processor and a memory, the processor configured to execute instructions stored on the memory to: (i) record the first amount of time elapsed by the timing device during the first study session; (ii) use an output from the neural network in a determination of an effectiveness of the first study session; (iii) calculate at least one value regarding the effectiveness of the first study session based on questions answered during the first study session that have been derived from material studied during the first study session; (iv) using the at least one value regarding the effectiveness of the first study session and the recorded first amount of time, calculate a second amount of time to be optimal for a second study session; and (v) cause the graphical user interface to propose the second amount of time when the user begins the second study session.

2. The system of claim 1, wherein the graphical user interface is located on a user terminal and associated with a study application, and the effectiveness of the first study session is further based on a determination of an amount of time that the user accessed one or more alternative application during elapse of the first amount of time.

3. The system of claim 1, wherein the graphical user interface is located on a user terminal and associated with a study application, and the effectiveness of the first study session is further based on a determination of a number of times that the user accessed one or more alternative application during elapse of the first amount of time.

4. The system of claim 1, which includes a user terminal, wherein the user terminal includes at least one of the graphical user interface, the timing device, the processor, and the memory.

5. The system of claim 1, wherein the processor is further configured to determine an optimal day and time for the user to perform the second study session.

6. The system of claim 5, wherein the processor is configured to update a digital calendar for the user by scheduling the second study session at the optimal day and time within the digital calendar.

7. The system of claim 1, which includes an image recording device, and wherein the processor is further configured to create a summary of the first study session using at least one image taken with the image recording device.

8. The system of claim 1, which includes an image recording device, and wherein the processor is further configured to create at least one question regarding material studied during the first study session using at least one image taken with the image recording device.

9. The system of claim 8, wherein the processor is configured to calculate the at least one value regarding the effectiveness of the first study session based on at least one user answer to the at least one question.

10. The system of claim 1, the effectiveness of the first study session is further based on a user assessment of the first amount of time elapsed during the first study session.

11. A method for optimizing one or more study session for a user, the method comprising:
    recording a first amount of time elapsed during a first study session performed by the user;
    using an output from a neural network configured to analyze images of study material in a determination of an effectiveness of the first study session;
    calculating at least one value regarding the effectiveness of the first study session based on questions answered during the first study session that have been derived from material studied during the first study session;
    calculating a second amount of time to be optimal for a second study session using the at least one value regarding the effectiveness of the first study session and the recorded first amount of time; and
    causing the second amount of time to be proposed to the user when the user begins the second study session.

12. The method of claim 11, which includes displaying a display screen for a study application on a user terminal controlled by the user during the first study session, and wherein calculating the at least one value regarding the effectiveness of the first study session further includes determining an amount of time that the user accessed one or more alternative application on the user terminal during the first study session.

13. The method of claim 11, which includes displaying a display screen for a study application on a user terminal controlled by the user during the first study session, and wherein calculating the at least one value regarding the effectiveness of the first study session further includes determining a number of times that the user accessed one or more alternative application on the user terminal during the first study session.

14. The method of claim 11, which includes determining an optimal day and time for the user to perform the second study session.

15. The method of claim 14, which includes updating a digital calendar for the user by automatically scheduling the second study session at the optimal day and time within the digital calendar.

16. The method of claim 11, which includes generating at least one question regarding the first study session based on an image of material studied during the first study session.

17. The method of claim 16, wherein calculating the at least one value regarding the effectiveness of the first study session includes calculating the at least one value using a metric based on at least one user answer to the at least one question.

18. The method of claim 11, wherein calculating the at least one value regarding the effectiveness of the first study session further includes using a user assessment of the first amount of time elapsed during the first study session.

* * * * *